United States Patent
Theodoulou et al.

(10) Patent No.: US 9,561,978 B2
(45) Date of Patent: Feb. 7, 2017

(54) SLUDGE SCREW THICKENER WITH SCREEN ROTATION DURING CLEANING

(71) Applicant: Anaergia Inc., Burlington (CA)

(72) Inventors: Michael David Theodoulou, Milton (CA); Juan Carlos Josse, Mission Viejo, CA (US)

(73) Assignee: Anaergia Inc., Burlington (CA)

( * ) Notice: Subject to any disclaimer, the term of this patent is extended or adjusted under 35 U.S.C. 154(b) by 229 days.

(21) Appl. No.: 13/826,410

(22) Filed: Mar. 14, 2013

(65) Prior Publication Data

US 2013/0277319 A1 Oct. 24, 2013

Related U.S. Application Data

(60) Provisional application No. 61/636,000, filed on Apr. 20, 2012.

(51) Int. Cl.
| | |
|---|---|
| *C02F 11/12* | (2006.01) |
| *B01D 29/64* | (2006.01) |
| *B01D 29/35* | (2006.01) |
| *B30B 9/12* | (2006.01) |

(52) U.S. Cl.
CPC ............ *C02F 11/121* (2013.01); *B01D 29/35* (2013.01); *B01D 29/6476* (2013.01); *B30B 9/12* (2013.01); *C02F 11/125* (2013.01); *C02F 11/126* (2013.01)

(58) Field of Classification Search
None
See application file for complete search history.

(56) References Cited

U.S. PATENT DOCUMENTS

| | | | | | |
|---|---|---|---|---|---|
| 1,564,585 | A | * | 12/1925 | Krause | 209/284 |
| 2,634,776 | A | * | 4/1953 | Kowan | A47J 19/027 |
| | | | | | 209/403 |
| 4,286,512 | A | * | 9/1981 | Berggren | 100/74 |
| 6,395,187 | B1 | * | 5/2002 | Alanis | 210/758 |
| 6,651,822 | B2 | * | 11/2003 | Alanis | 210/394 |
| 6,899,807 | B2 | * | 5/2005 | Cummings | 210/97 |
| 8,017,021 | B1 | * | 9/2011 | Staples | 210/773 |
| 8,302,780 | B1 | * | 11/2012 | Mitchell et al. | 210/391 |
| 2003/0042193 | A1 | * | 3/2003 | Alanis | 210/413 |
| 2013/0213904 | A1 | * | 8/2013 | Mitchell et al. | 210/783 |

(Continued)

FOREIGN PATENT DOCUMENTS

| | | |
|---|---|---|
| JP | H04200899 A | 7/1992 |
| JP | H06098513 B2 | 12/1994 |

(Continued)

OTHER PUBLICATIONS

English Abstract of JP 2005279731.

(Continued)

*Primary Examiner* — Robert James Popovics

(57) ABSTRACT

A screw press has a cylindrical screening section mounted to a frame. The screening section is able to rotate but can be prevented from rotating. A sprayer system is operable to spray water on the screening section. In a cleaning process, the screening section is rotated while water is sprayed against it. Optionally, the power required to rotate the screen may be provided by an auger drive mechanism. The screening section may have openings sized to retain flocculated solids. The screw press may be used to thicken a sludge from a waste water treatment plant.

4 Claims, 2 Drawing Sheets

(56) References Cited

U.S. PATENT DOCUMENTS

| | | | | |
|---|---|---|---|---|
| 2013/0277319 A1* | 10/2013 | Theodoulou | .......... | C02F 11/125 210/770 |
| 2015/0076059 A1* | 3/2015 | Theodoulou | ........... | B01D 29/35 210/608 |
| 2015/0076085 A1* | 3/2015 | Theodoulou | .......... | C02F 11/125 210/780 |
| 2015/0329399 A1* | 11/2015 | Kumar | .................... | C01C 1/242 71/10 |

FOREIGN PATENT DOCUMENTS

| | | | |
|---|---|---|---|
| JP | 2005279731 A | 10/2005 | |
| JP | H06098517 B2 | 7/2013 | |

OTHER PUBLICATIONS

English Abstract of JP H04200899.
English Abstract of JP H06098513.
English Abstract of JP H06098517.
International Search Report of PCT/CA2013/050297.

* cited by examiner

SLUDGE SCREW THICKENER WITH SCREEN ROTATION DURING CLEANING

RELATED APPLICATIONS

This application claims the benefit of U.S. Provisional Application No. 61/636,000 filed Apr. 20, 2012, which is hereby incorporated by reference.

FIELD

This specification relates to separating solids from liquids, screw presses and to methods of thickening sludge.

BACKGROUND

In general, a typical screw press comprises a screw, also called an auger, rotating within a fixed cylindrical body comprising screen panels. A solid-liquid mixture to be treated is fed into an inlet end of the screw press. The auger conveys the mixture through the cylindrical body while pressing the mixture against the screens. Liquid and fine solids are collected from the outside of the screens. Retained solids and residual liquid are collected from an outlet end of the screw press. The cylindrical body is dismantled when the screens need to be cleaned.

In International Publication Number WO02/062564, a screw press is used to separate solids from sewage. A screw is driven by an electric motor. The direction of rotation of the screw is reversed periodically to clean the screw press.

In International Publication Number WO99/52704, a screw press has a cylindrical body made up of a stack of annular plates. Some of the plates are fixed and some of the plates are movable. An eccentric shaft passing through the stack of plates rotates when the auger rotates. The rotation of the eccentric shaft causes the movable plates to oscillate relative to the fixed plates.

INTRODUCTION TO THE INVENTION

The following introduction is intended to introduce the reader to the detailed description but not to limit or define the claimed invention.

A screw press described in this specification has a cylindrical screening section mounted to a frame of the press such that the screening section is able to rotate. Restraints between the screening body and the frame may be configured to allow the screening body to rotate or to inhibit or prevent the screening body from rotating. A sprayer system is provided on the outside of the screening body. A motor may be used to cause the screening body to rotate. Optionally, the motor may also drive an auger within the screening body.

A screw press described in this specification has a screening body with opening sizes appropriate to retain flocculated solids. Optionally, a sprayer system may be provided on the outside of the screening body. Optionally, an auger shaft may have an increased diameter towards an outlet end of the press.

A screw press cleaning method described in this specification comprises steps of spraying water at a screening section of the screw press from outside of the screening section. Optionally, the screening section may be rotated while water is sprayed at it.

The invention provides an alternative device for separating solids from a liquid or an alternative method of operating a screening device. The device and method may be used, for example, to thicken sludge from a wastewater treatment plant such as primary or activated sludge from a municipal sewage treatment plant.

DETAILED DESCRIPTION

Figure 1:
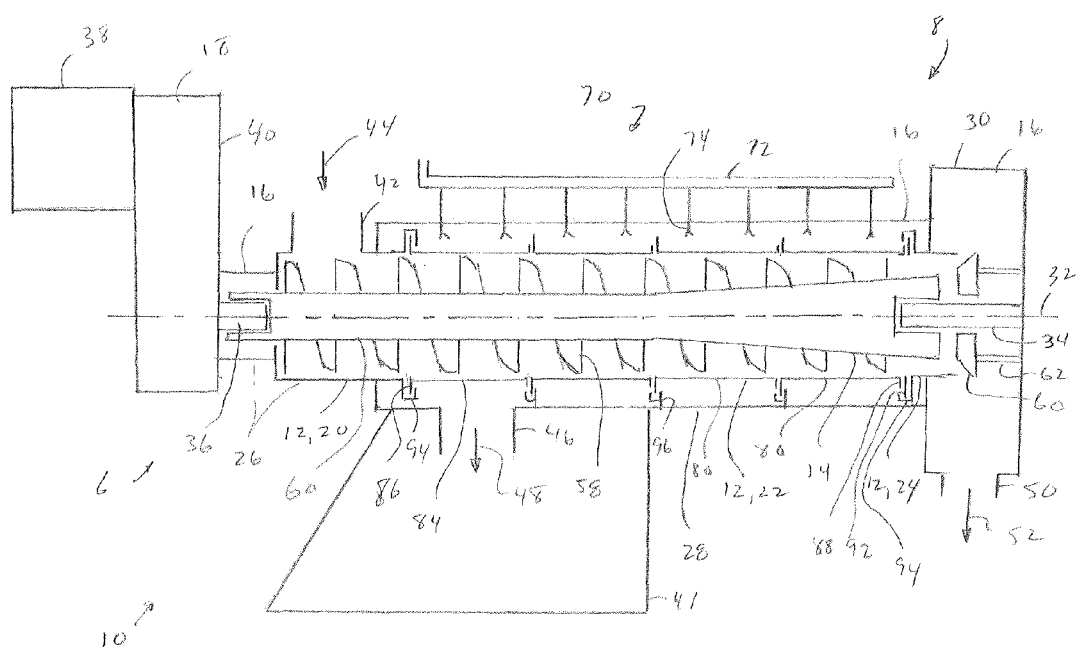
FIG. 1 shows a schematic cross sectional view of a screw press with a screening section.

FIG. 1 shows a screw press 10 having an inlet end 6 and an outlet end 8. The screw press 10 has a cylindrical screening body 12 and a frame 16. The screening body 12 has a non-porous inlet section 20, a porous screening section 22 and a non-porous outlet section 24. The frame 16 similarly has an inlet portion 26, a central portion 28 and an outlet portion 30. The inlet portion 26 of the frame 16 may share components with or support the inlet section 20 of the screening body 12. The central portion 28 of the frame 16 at least partially surrounds the screening section 22 of the screening body 12. The outlet portion 30 of the frame 16 may share components with or support the outlet section 24 of the screening body 12.

The screw press 10 also has an auger 14 and a drive mechanism 18. The auger 14 is located within the screening body 12 and is supported by the frame 16. In particular, the auger 14 and screening body 12 are concentric about a central axis 32 of the screw press 10. One end of a shaft 60 of the auger 14 is supported through a bearing (not shown) on a stationary post 34 attached to the outlet portion 30 of the frame 16. The other end of the auger shaft 60 of the auger 14 is supported on a drive shaft 36 of the drive mechanism 18. A blade 58 of the auger 14 is attached in a spiral around the auger shaft 60 and extends towards, or optionally touches, the inside of the screening body 12. The drive mechanism 18 is attached to the inlet portion 26 of the frame 16 and comprises a motor 38 and a gearbox 40. The frame 16 is supported on the ground through a frame 41.

The inlet portion 26 of the frame 16 has an inlet 42 to receive a feed mixture 44. The central portion 28 of the frame 16 has a liquid outlet 46 to discharge a liquid fraction 48 of the feed mixture 44. The outlet portion 30 of the frame 16 has a solids outlet 50 to discharge a solids fraction 52 of the feed mixture. The liquid fraction 48 may have some solids remaining in it but at a reduced solids concentration relative to the feed mixture 44. The solids fraction 52 may have some liquid in it but at a higher solids concentration than the feed mixture 44.

In operation, the feed mixture 44 is pumped into the inlet 42 at an initial pressure. The drive mechanism 18 rotates the auger 14 causing the blade 58 to convey the feed mixture 44 along the screening body 12. The auger 14 preferably also increases the pressure of the feed mixture 44. Liquid and fine solids in the feed mixture 44 are forced through the screening body 12. These liquids and fine solids are collected in the central portion 28 of the frame 16 and discharged through liquid outlet 46. The remainder of the feed mixture 44 exits the screening body 12 after passing by a counter pressure cone 60. Counter pressure cone 60 is biased towards the screening body 12 by a biasing mechanism 62 such as a set of springs or a pneumatic cylinder. The solids fraction 52 drops from the end of the screening body 12 and is discharged from the frame 16 through the solids outlet 50.

The internal volume of the screening section 22 preferably decreases towards the outlet end 8 of the screw press 10. This helps maintain pressure in the screening section 22 even though the liquids fraction 48 is removed from the feed mixture 44. A decreasing volume may be obtained by reducing the diameter of the screening section 22. Alternatively, the pitch of the blades 58 may be decreased towards the outlet end 8 of the screw press. Both of these methods, however, prevent the use of a blade 58 having a uniform outer diameter and pitch, which is more easily manufactured to a tight fit with the screening section 22. In the screw press 10 of FIG. 1, a decreasing internal volume is provided by increasing the diameter of at least a portion of the shaft 60 towards the outlet end 8 of the screw press 10.

The screening section 22 of the screening body 12 has openings of a size and shape adapted to provide a selected degree of separation. For example, the screening section 22 may remove fibrous materials from the digestate of an anaerobic digester treating manure or other agricultural wastes. Alternatively, the screening section 12 may have smaller openings suited to separating flocculated solids from primary or activated wastewater treatment sludge. For example, the screening section 22 may be made from wedgewire with a slot opening in the range from about 0.25 mm to about 0.75 mm.

Although any screw press may benefit from having a convenient cleaning method, cleaning is required more frequently when the screening section 22 has small openings. In particular, when the screw press 10 is used to thicken sludge, dismantling the screw press 10 for cleaning is undesirable. The screw press 10 is fitted with a sprayer system 70 to allow cleaning by spraying water against the outside of the screening section 22. When cleaning is required, water is pumped through a manifold 72 to a series of sprayer heads 74 located inside of the central portion 28 of the frame 16. The screw press 10 of FIG. 1 has one manifold 72, but there may be multiple manifolds 72 spaced around the circumference of the screening body 12.

The water sprayed against the screening section 22 moistens and breaks up accumulations of solids caught in the openings of the screening section. Some of the water may also force its way through the openings of the screening section 22 in a reverse direction. The water is preferably heated. In order to assist the water in cleaning the screening section 22, the supply of feed mixture 44 may be stopped while the auger 14 continues to rotate for a period of time before the water is sprayed. This reduces the volume or pressure, or both, of the feed mixture 44 inside the screening section 22.

Figure 2:
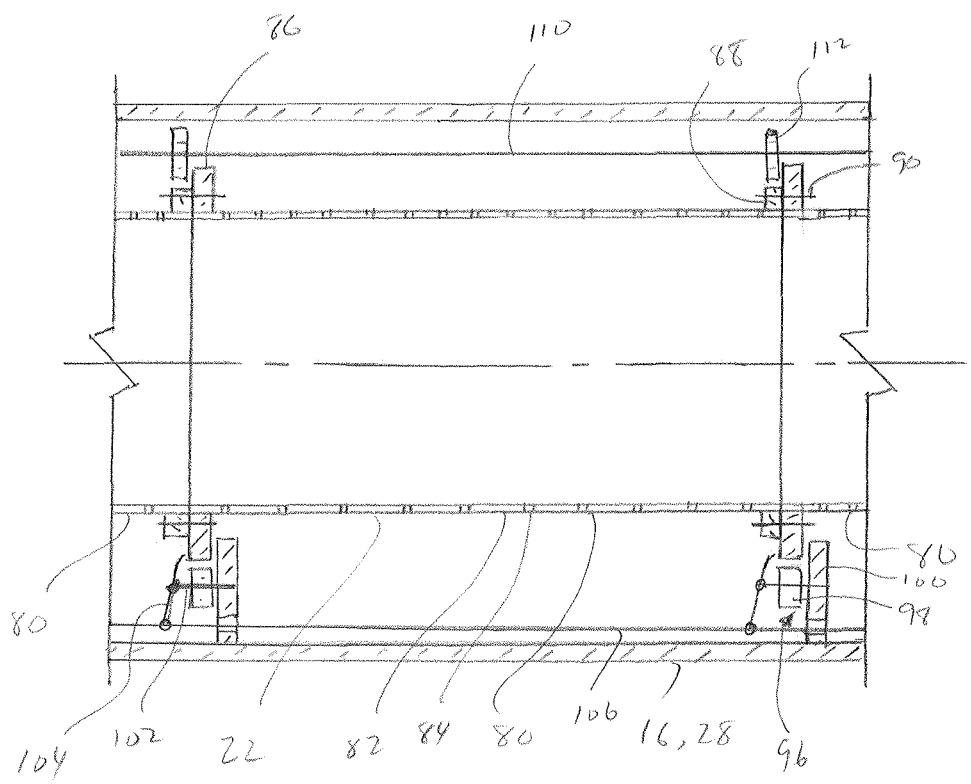
FIG. 2 shows a portion of the screening section of FIG. 1 with optional screening section mounts and restraints and optional drive mechanisms for rotating the screening body.

Referring to FIG. 2, the screening section 22 may be made up of screen panels 82 having openings 84. In the construction shown in FIG. 2, the screening section 22 is made up of segments 84 each having a cylindrical screen panel 82 attached to a forward flange 86 and a rearward flange 88. The screening section is built up by attaching the rearward flange 88 of one segment 84 to the forward flange 86 of another segment 84, optionally by way of fasteners 90. Other methods of constructing a screening section 22 may also be used.

Referring back to FIG. 1, a forward flange 86 at one end of the screening section 22 is held within a receiver 94 attached to the frame 16 through the inlet section 20 of the screening body 12. Alternatively, the receiver 94 may be attached directly to the frame 16. The receiver 94 contains a bearing, such as a brass or plastic ring or a race of ball bearings, and allows rotation of the screening section 22. Similarly, a receiver 94 is attached to the frame 16 and holds, but allows rotation of, the other end of the screening section 22. This second receiver 94 may hold a rearward flange 88 or a supplementary flange 92 fastened to a rearward flange 88. In this way, at least the screening section 22 of the screening body 12 is allowed to rotate about the central axis 32. Optionally, one or more non-porous parts of the screening body 12 may also be allowed to rotate. Optionally, intermediate bearing mechanisms 96 may be provided to support, but allow rotation of, the screening section 22.

Referring back to FIG. 2, each bearing mechanism 96 has a roller 98 supported through a post 100 by the frame 16. The roller 98 spins on an axle 102 supported by the post 100. Three or more bearing mechanisms 96 may be spaced around the circumference of the frame 16 at each longitudinal position shown in FIG. 1 to better support and center the screening section 22. A lever 104 supported on the end of an axle 102 is attached to an actuator 106. When the actuator 106 is moved to the left, the lever 104 bears against a forward flange 86. The lever 104 may apply friction to reduce the speed of rotation of the screening section 22 or to stop the screening section 22 from rotating. Moving the actuator 106 to the right lessens or removes the friction. Moving the actuator 106 even further to the right moves the lever 104 to the outside of the forward flange 86 so that the screening section 22 can be pulled out of, or inserted into, the frame 16.

An alternative mechanism for supporting or facilitating a desired rotation of the screening section 22 is shown at the top of FIG. 2. In this alternative, rearward flanges 88 are made in the form of ring gears. A gear shaft 110 supported by the frame 16 is fitted with gears 112 that engage the rearward flanges 88. The gear shaft 110 may be supported by the frame 16 at intermediate positions to allow the gears 112 to help support or center the screening section 22. Alternatively or additionally, the gear shaft 110 may be attached to a brake such that the gear shaft 110 can be used to stop or slow the rotation of the screening section 22. Alternatively or additionally, the gear shaft 110 may be connected to the gearbox 40 of the drive mechanism 18, or to a separate drive mechanism, so that the gear shaft 110 can be used to drive the rotation of the screening section 22.

When rotation of the screening section 22 is not restrained, the screening section 22 will tend to rotated with the auger 14 due to friction between the auger 14 and the screening section 22. Optionally, the screening section 22 may be forced to rotate with the auger 14 by actuating a releasable connection (not shown) between the auger 14 and the screening section 22. Alternatively, the screening section 22 may be driven by the drive mechanism 18 without applying force through the auger 14, for example by use of the gear shaft 110 of FIG. 2. In all of these examples, the motor 38 is used, directly or indirectly, to rotate the screening section 22. A separate motor may also be used to rotate the screening section 22. In some of the examples above, the screening section 22 may be rotated when the auger 14 is not rotating or at a different speed than the auger 14. In some other examples, such as applying some friction to the screening section 22 while the auger 14 is rotating, the screening section 22 can only be rotated while the auger 14 is rotated but the screening section 22 may rotate at a different speed than the auger 14.

The screening section 22 is preferably rotated while water is sprayed against it during the cleaning process described above. Rotating the screening section 22 allows each part of the screening section to pass under a line of sprayer heads 74. Multiple manifolds 72 are not required. Rotating the screening section 22 also allows each part of the screening section 22 to be placed at or near the top of the screening section 22 so that gravity may assist in the cleaning. Rotating the screening section 22 also avoids having the bottom of the screening section 22 accumulate solids that fall from upper parts of the screening section 22 during cleaning. Optionally, the screening section 22 may be stopped and the auger 14 may be rotated for a period of time during or after the cleaning procedure to convey backwashed solids out of the screening section 22. Alternatively, the auger 14 may be rotated at a faster speed than the screening section 22 during the cleaning process to convey material released during cleaning out of the screening section 22.

After the cleaning procedure, the screening section 22 is restrained from rotating, the auger 14 resumes or continues normal rotation, and the supply of feed mixture 44 is restarted. The screening section 22 is typically prevented from rotating during operation of the filter press 10 except when cleaning the screening section 22.

The invention claimed is:

1. A process of operating a screw press comprising the steps of,
   a) rotating an auger within a screening section while the screening section is rotationally fixed; and,
   b) rotating the screening section while spraying water against the screening section.

2. The process of claim 1 wherein the screening section is rotated by power supplied by a motor that rotates an auger of the screw press.

3. The process of claim 2 wherein the screening section is rotated by friction between the auger and the screening section.

4. The process of claim 1 comprising feeding the screw press with a wastewater treatment sludge.

* * * * *